United States Patent [19]

Müller et al.

[11] Patent Number: 4,869,359

[45] Date of Patent: Sep. 26, 1989

[54] APPARATUS FOR FORMING SEPARATE PILES OF EQUAL-NUMBERED DISK-LIKE WORKPIECES FROM A LONGITUDINALLY MOVING STACK

[75] Inventors: Jürgen Müller; Eberhard Halle, Bunzlaustrasse 2, 3300 Braunschweig, both of Fed. Rep. of Germany

[73] Assignees: Schmalbach Lubeca AG; Eberhard Halle, both of Braunschweig, Fed. Rep. of Germany

[21] Appl. No.: 217,430

[22] Filed: Jul. 8, 1988

[30] Foreign Application Priority Data

Jul. 11, 1987 [DE] Fed. Rep. of Germany ....... 3722976

[51] Int. Cl.[4] ................................................ B65G 47/26

[52] U.S. Cl. .................................... 198/419.2; 53/501; 53/542; 414/795.6; 414/796; 414/798.9

[58] Field of Search ............... 198/418.7, 419.1, 419.2; 414/795.6, 796, 798.9, 901, 907; 53/500, 501, 542

[56] References Cited

U.S. PATENT DOCUMENTS

| | | | |
|---|---|---|---|
| 3,442,186 | 5/1969 | Hirose et al. | 53/500 |
| 3,962,845 | 6/1976 | Mojden et al. | 53/500 |
| 4,038,909 | 9/1977 | Preisig | 198/419.1 |
| 4,537,550 | 8/1985 | Mojden et al. | 414/796 |
| 4,742,669 | 5/1988 | Mojden | 53/500 |

FOREIGN PATENT DOCUMENTS

| | | |
|---|---|---|
| 2417527 | 10/1974 | Fed. Rep. of Germany . |
| 3333521 | 4/1985 | Fed. Rep. of Germany . |

*Primary Examiner*—Joseph E. Valenza
*Attorney, Agent, or Firm*—Herbert Dubno

[57] ABSTRACT

The apparatus for forming separate piles of equal-numbers of workpieces, especially can covers, from a stack moving longitudinally in a feed trough is equipped with an electronic counter and controller with a sensor responding to the edge of the workpiece which operates without contact with the workpiece and with a feed device which is shiftable into a clamped and a released position engaged on the stack upstream of the sensor in the feed direction. It is drivable in the clamped position with at least two feed speads. Moreover a separating mechanism is provided with a separating wedge movable to-and-fro transverse to the stack to form a separating gap in the edge region between the adjacent workpieces of the pile and the stack together with two separating knives guidable into the separating gap which are connected with a drive acting in the longitudinal direction of the stack. The new apparatus can be mounted at each position along the conveying trough without interruption of or blocking the trough. A very exact counting with larger tolerances for the cover edges is possible. it is easy to adjust the apparatus to different cover sizes.

15 Claims, 5 Drawing Sheets

APPARATUS FOR FORMING SEPARATE PILES OF EQUAL-NUMBERED DISK-LIKE WORKPIECES FROM A LONGITUDINALLY MOVING STACK

FIELD OF THE INVENTION

Our present invention relates to an apparatus for forming separate piles (e.g. groups or sets) of equal-numbered disk-like flat workpieces stacked on one another or placed alongside one another from a longitudinally moving stack of these workpieces and, more particularly, to an apparatus for making separate piles of flat can covers from a longitudinally moving stack of can covers.

BACKGROUND OF THE INVENTION

An apparatus is described in German Open Patent Application 24 17 527 in which gear wheels whose gear teeth spaces correspond in size to the thickness of the can covers and whose rotation is detected by an optical unit project into the motion path of the can covers in the stack. The can covers travelling past gaps provided in it are counted by an electronic counter and are assembled in a pile with a predetermined number of covers. An engaging piece on a sliding support or carriage is guided into the gap between the last cover of the pile and the following stack and is accelerated forwardly to separate the pile from the stack by the sliding support or carriage.

Another apparatus for separating piles of covers with equal numbers of covers from a longitudinally moving stack operates practically exclusively mechanically and uses no electronic control (German Open Patent Application 33 33 521).

The known apparatuses are comparatively expensive and operate with a comparatively low speed of up to approximately 500 workpieces and/or can covers per second. A satisfactory operation is only attainable when the workpieces to be counted and/or the can covers to be counted have very small tolerances in the vicinity of their edges which cooperate with the counter. In making can covers with edges rolled in and/or shaped for receiving sealing material, larger tolerances may not be avoidable because of differing working material properties and/or wear of tools. When the usability of the cover is not impaired in forming the edges with larger tolerances, it is desirable to form the covers with tolerances which are as large as possible during edge formation because of manufacturing engineering and economic considerations.

OBJECTS OF THE INVENTION

It is an object of our invention to provide an improved apparatus for forming separate piles of equal numbered disk-like workpieces from a longitudinally moving stack of these workpieces which has a very high counting speed while allowing greater tolerances in the workpieces to be counted in the vicinity of their edges without increasing the error quota.

It is an also object of our invention to provide an improved apparatus for forming separate piles of equal numbered disk-like workpieces from a longitudinally moving stack of these workpieces which has a very high speed, but can be easily and quickly adjusted to handle workpieces of different diameters.

SUMMARY OF THE INVENTION

These objects and others which will become more readily apparent hereinafter are attained, in accordance with our invention, in an apparatus for forming separate piles of equal numbered flat disk-like covers, especially can covers, placed side-by-side or contacting each other from a stack longitudinally moving in a conveying trough comprising an electronic counter and controller, a separating mechanism with an engaging piece guided into the stack and guided slidably substantially parallel to the conveying trough accelerating the pile being formed forwardly.

According to our invention, a sensor operating without contact, i.e. a contactless sensor responds to an edge of a workpiece as a pulse generator connected with the electronic counter. A feed device is shiftable into a clamped and a released position and engages the stack upstream from the sensor in the feed direction. The feed device is drivable in the clamped position by the controller with at least two feed speeds one of which corresponds to a creeping or slow speed. The separating mechanism is equipped with a separating wedge movable to-and-fro transversely to the stack for formation of a separating gap between adjacent workpieces of the pile and the stack in the vicinity of their edges and at least two separating knives operatively connected to a longitudinal drive acting in the longitudinal direction of the stack.

Since the sensor responds to the edge of the workpiece which operates without contact as a pulse generator for the counter, it is possible to have only one pulse generated for each edge or to adjust the sensor independently of differences in the edge thickness of the workpiece to be counted so that it detects the deep intervening space between adjacent edges with round workpiece edges and makes a pulse.

The use of this sensor allows a very high feed speed with a greater counting rate.

The feed device movable into a clamped and a released position positioned in front of or upstream of the sensor allows the feed of the stack, which can be effected mechanically or manually, to determine with precision shortly before reaching the desired number of workpieces in wach pile by the above-mentioned feed device alone.

This feed device operates in a creeping process or slow process just before reaching the desired number of workpieces in a pile and thus allows the precise separation of the pile from the following stack by the above-named separating mechanism.

A separating gap, in which the separating knives can engage, is made by the above-named separating wedge at a position on the circumferential edge behind the last workpiece of the pile to accelerate the pile from the following stack to form an increasingly larger space. The insertion depth of the separating knives can be kept small, if the knives fit the outer contour of the workpiece. Hence only minimal guiding motions of the knives and also the separating wedge are required to effect a reliable separation of the pile from the stack.

The apparatus can be kept very compact relative to the workpiece size and is positioned only above the conveying trough. It is advantageous when the sensor, the feed device and also the separating mechanism are located in a common supporting frame extended above and along the conveying trough with adjustable height supporting members releasably attached to the conveying trough and adjustable in a direction transverse to the conveying trough. The apparatus can be mounted at any position along the conveying trough without the conveying trough being interrupted or blocked.

To compensate for diameter tolerances of the workpiece and/or to provide for workpieces with different diameters, the sensor is mounted in an adjustable-height spring-loaded sliding guide held on the supporting frame. The sliding guide can slide over the edges of the workpieces and thus guarantees a continuous constant spacing of the sensors from the edge of the work pieces. It is especially appropriate when this sensor is a reflection sensor with two sensor cells.

The feed device can have a motorized carriage movable above the stack along the supporting frame with twin levers pivotally connected to the carriage each carrying a clamp jaw on an end pressing against the stack and being operatively connected to a spreader operating against the action of a spring on the other end opposite from the stack. The spreader comprises two supporting pieces each of which is operatively connected to the other by a spring and with one of the twin levers having oppositely-inclined inclined surfaces facing each other and a wedge slidable along and between the inclined surfaces. The slidable wedge can be operatively connected to a spreader drive mounted on the carriage or in the feed device. The twin levers of the feed device are lockable and movable in spaced relation from each other and against each other with their ends held in the supporting pieces to change the spacing of the clamping jaws. Thus adjustment of the feed device for workpieces of different diameters is easy and rapid.

Several other features of the separating mechanism are especially appropriate. The separating knives can be guided adjacent the separating wedge on both sides of the separating wedge into a separating space or gap and can be held on a sliding support guided in the supporting frame and the separating wedge can be guided by a plurality of slide rods in the sliding support for the separating knives.

The slide rods for the separating wedge and the sliding support for the separating knives have a common separating drive, which engages on the slide rods for the separating wedge and in guiding the separating wedge into the stack the sliding support travels with the slide rods after the slide rods traverse an adjustable empty space.

The separating knives can be held on push rods passing through the sliding support, which are operatively connected to the longitudinal drive acting along the conveying trough, and the longitudinal drive which can be a piston-cylinder drive can be pivotally connected to the supporting frame with an end opposite from the separating wedge pivotable upwardly.

When the cutting knives have oppositely-inclined engaging edges, they can be used for separating workpieces of different diameters without replacement.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
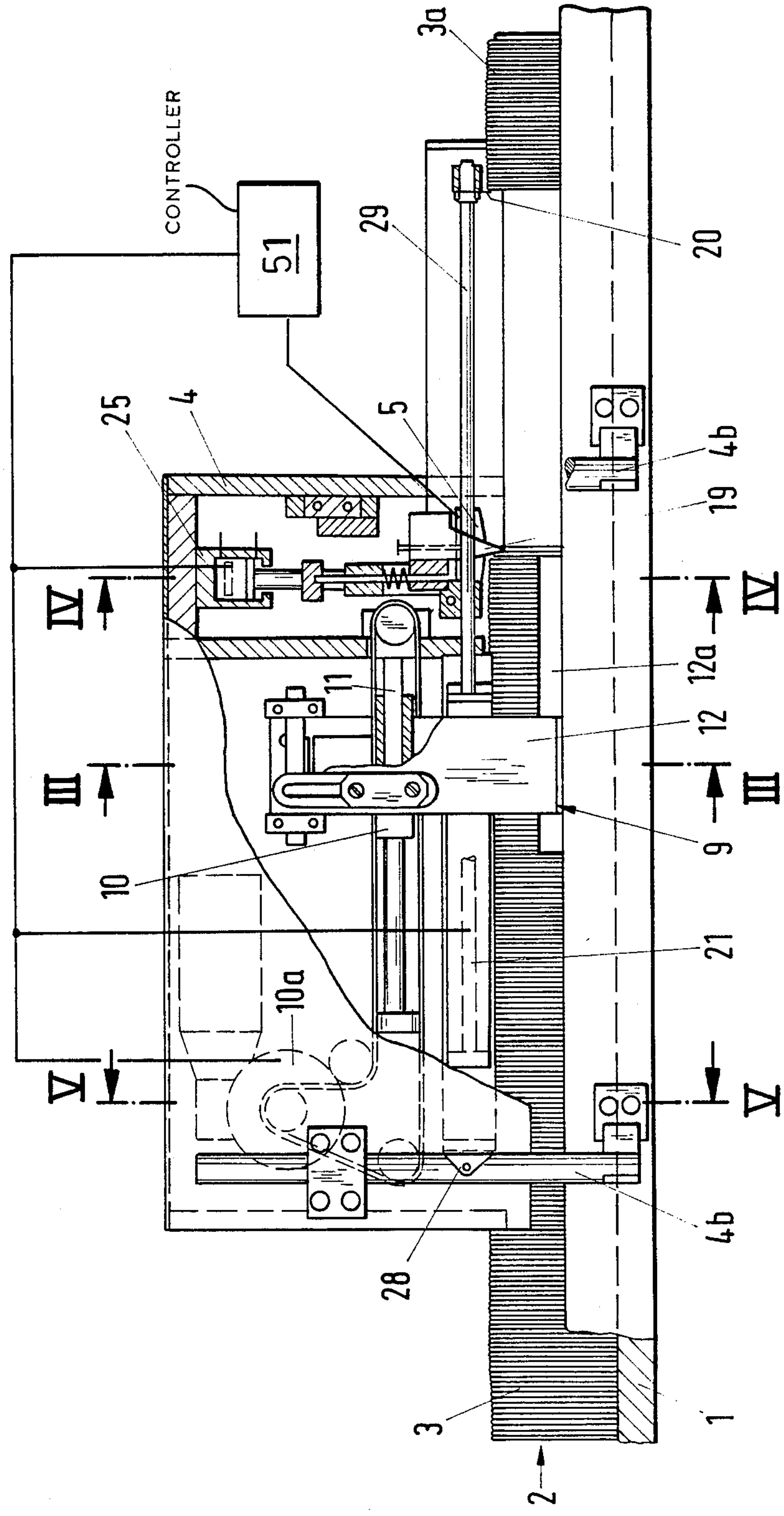
FIG. 1 is a purely schematic side view of an apparatus according to our invention shown during a counting process after separation of a pile of workpieces from the stack.

With the embodiment shown it should be assumed that the apparatus is for counting can covers D with rolled in edges E.

The conveying trough 1 running horizontally in this example is adjusted to fit to the diamter of the can cover in the stack 3. The can covers are to be fed through by hand or mechanically along the trough 1 in the direction of the arrow 2 (the feed direction or the longitudinal stack direction) and are to be divided into individual piles 3*a* with equal numbers of covers.

A supporting frame 4 is distinguishable above the conveying trough 1. The mechanisms for the counting process and the process of separating the stack into piles 3*a* are mounted in this supporting frame 4. The electronics cooperating with these mechanisms is accomodated in a separate housing indicated with only a single block in the drawing.

The supporting frame 4 has adjustable height and supporting members 4*b* are laterally adjustable in a direction transverse to the conveying trough 1. With these supporting members 4*b* the supporting frame 4 is attachable to the conveying trough 1 at each point along the trough.

An adjustment to different width conveying troughs 1 and also to different stack heights, i.e. to stacks made from can covers of a different diameter, is possible by the above-mentioned adjustability of the supporting members 4*b* of the supporting frame 4.

For generation of the counting pulse a sensor operating without physical contact comprising sensor cells 6 and 7 is provided on the supporting frame 4 which is connected with an electronic counter and controller 51 shown with a block in FIG. 1.

Figure 2:
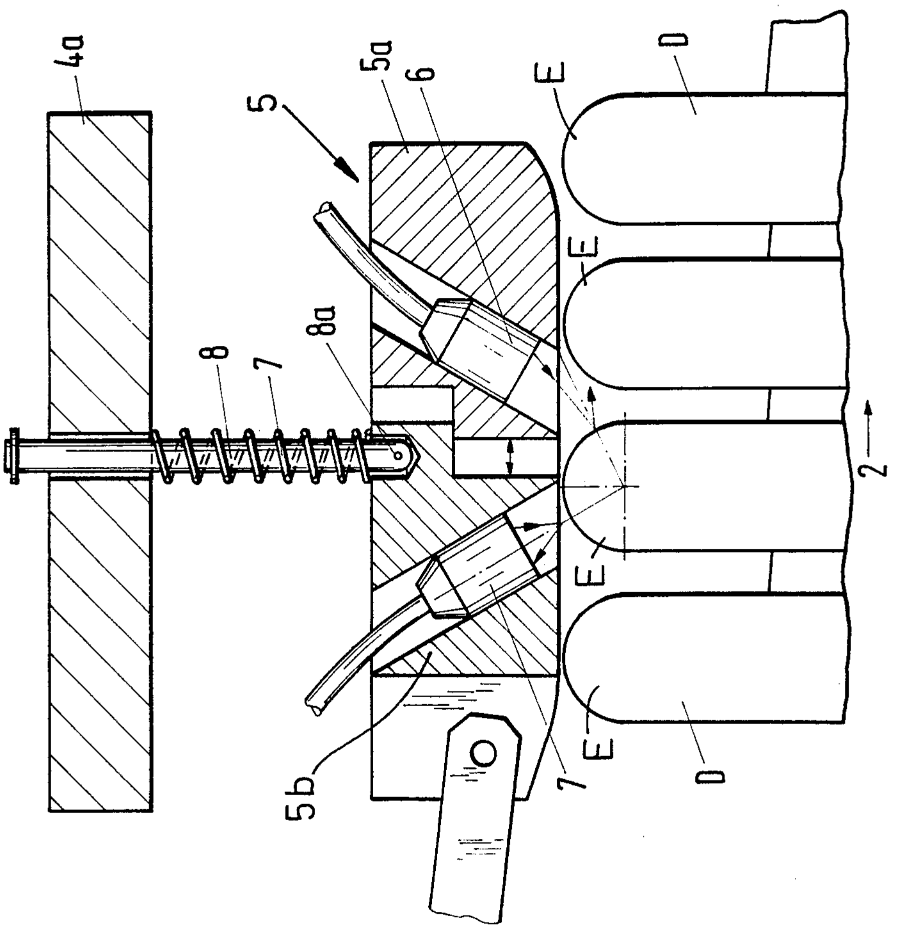
FIG. 2 is a detailed partially longitudinal cross-sectional view through the apparatus in the vicinity of the sensor.

The sensor 6,7 is mounted on an adjustable-height sliding guide 5 spring-loaded on the supporting frame 4. FIG. 2 is a cross-sectional view through the sliding guide 5 in detail.

The sliding guide 5 is mounted on a beam 4*a* of the supporting frame 4 by a lifting rod 8 guided with play in the beam 4*a* and by a spring 7 mounted on it and spring-loading it. The sliding guide 5 is attached to the lifting rod 8 so that it can perform pivoting motions limited by the play between the lifting rod 8 and the associated sliding guide 5 in the hole at the point attachment 8*a*.

The sliding guide 5 slides on the round edge E of the cover D located below it so that it can adjust itself by the described adjustability to the diameter tolerances of the cover D and provides that both sensor cells 6 and 7 of this example, which jointly form the reflection sensor 6,7, continuously remain the same distance from the round edge E of the cover D to be counted.

In the example, the sliding guide 5 is made from two parts 5*a* and 5*b* slidable relative to one another to adjust the spacing of the sensor cells 6 and 7 to the thickness of the cover D to be counted.

A feed device 9 shiftable into a clamped and a released position engaging the stack 3 is provided in the feed direction in front of the upstream of the sliding guide 5 with the sensor cells 6 and 7 mounted in it. This feed device 9 is movable to-and-fro along the supporting frame 4 by a motor driven carriage 10 on the guide rods 11. The motor drive mechanism 10*a* for the carriage 10 is controlled electronically so that the carriage 10 is drivable in the clamped position of the feed device 9 with two speeds, of which one corresponds to a creeping or slow speed.

Figure 3:
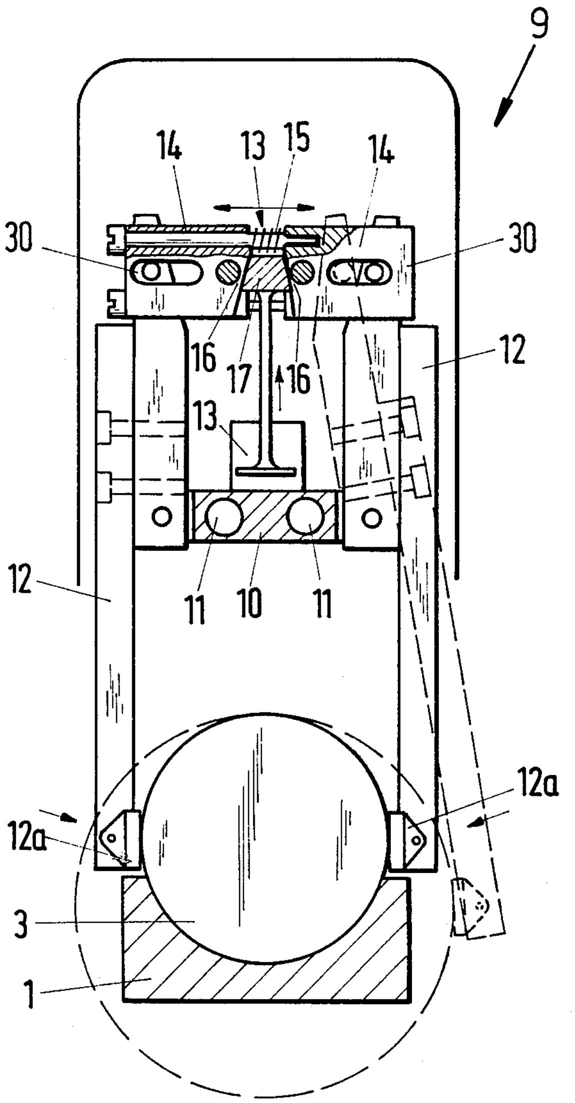
FIG. 3 is a detailed partially cross sectional view taken along the section line III—III of FIG. 1.

As is especially clearly indicated in FIG. 3, the feed device 9 has two twin levers 12 pivotally mounted on the carriage 10 on opposite sides which carry opposing clamp jaws 12*a* on their lower ends pressible to the stack 3. The upper ends of the twin levers 12 are operatively connected to a spreader indicated by 13. This spreader 13 comprises two supporting pieces 14 which are operatively connected to each other by a spring 15 which tries to pull the supporting pieces 14 together. The supporting pieces 14 have oppositely-inclined surfaces 16 facing one another which cooperate or act together with a wedge 17 slidable along these surfaces. The wedge 17 is operatively connected to a spreader drive 18 held on the carriage 10 of the feed device 9.

The spreader drive 18 can be a piston-cylinder drive. In operation the spreader drive 18 is pushed upwardly and causes a spreading motion of the supporting pieces 14, which forces the upper ends of the twin lever 12 operatively connected to it exteriorly so that the clamp jaws 12*a* come into engagement with the stack 3.

With the clamp jaws 12*a* contacting the stack 3, the feed of the stack 3 which, with the clamp jaws open, an be caused mechanically or manually, is only determined by the feed device 9 alone.

The feed device 9 is put in the retracted position by the electronic controller 51, when the number of covers required for a pile to be separated has been nearly reached. The feed device 9 is operated with its higher speed after pressing the clamping jaws 12*a* to the stack and moves in the feed direction 2. When only a few covers are still missing from the pile to be separated, the feed device 9 is shifted electronically to the reduced speed, which corresponds to a creeping or slow process. The feed is completely interrupted, when the predetermined number of the covers in the pile is reached.

This position of the feed device 9 is reproduced in FIG. 1 so that in this drawing, the separation of the pile 3*a* with the help of the separating mechanism is illustrated.

The separating mechanism has a separating wedge 19 movable up and down and back in this example, which is shown in FIG. 1 very enlarged.

Further, the separating mechanism is equipped with two separating knives 20 on both sides of the separating wedge 19 guidable into a separating gap or space, which are connected with a longitudinal drive 21 acting along the stack 3 which comprises a piston-cylinder drive in the illustrated example.

Figure 4:
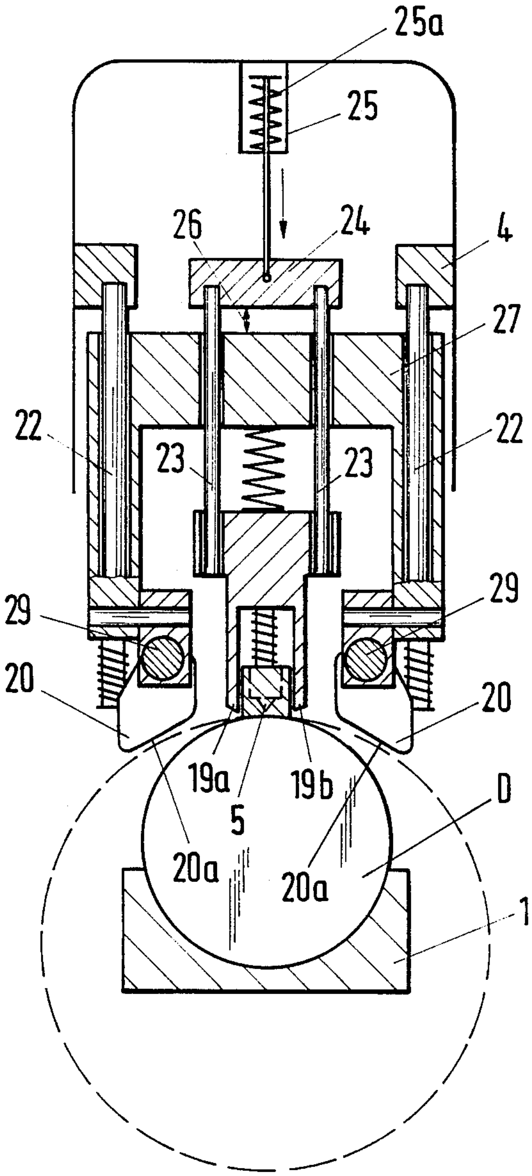
FIG. 4 is a detailed cross sectional view taken along the section line IV—IV of FIG. 1.

The structure of the separating mechanism is shown in the cross-sectional view of FIG. 4. The separating wedge 19 has two wedge portions 19*a* and 19*b* running parallel to each other in this example. These wedge portions enclose the sliding guide 5 with play as shown in FIG. 4. The separating knives 20, which have oppositely inclined engaging edges 20*a*, are detectable on both sides of the separating wedge 19 and are mounted on a sliding support 27 guided in the supporting frame 4. The sliding support 27 is guided on slide members 22 which are kept locally fixed in the supporting frame 4.

The yoke of the sliding support 27 forms a sliding guide for the separating wedge 19. It comprises slide rods 23, which are guided through suitable holes in the yoke of the sliding support 27 and carries a supporting plate 24 on its upper end. This is operatively connected to a separating drive 25 which includes a restoring spring 25*a*. The separating drive 25 is a piston-cylinder drive. By the schematically illustrated separating drive 25 both the separating wedge 19 and also the separating knives 20 are guided in and/or form a separating gap or space between the counted covers of a pile 3*a* and the following stack 3.

In acting on the separating drive 25 only the separating wedge 19 is first moved downwardly to form the separating gap or space until an empty space 26 formed between the supporting plate 24 and the sliding support 27 is traversed by the supporting plate 24. Then the supporting plate 24 takes the sliding support 27 so that the cutting knives 20 are guided in under control in the separating space or gap formed by the separating wedge 19.

The separating knives 20 can thus generate this motion because the piston-cylinder drive operatively connected to them (FIGS. 1 and 2) is operatively connected to the supporting frame 4 at its end opposite the end adjacent the cutting knives 20 by a joint 28.

By operation of the longitudinal drive 21, the push rods 29 with the separating knives 20 mounted on them are moved in the feed direction of the stack 1 to form the gap or space between the stack 3 and the pile 3*a* of covers and then are again guided back into their initial position by the longitudinal drive 21.

Both the separating wedge 19 and also the separating knives 20 are brought back by the restoring spring 25*a* seen in FIG. 4 into their initial position. Then the return of the feed device 9 into its initial position occurs by the motorized drive 10*a* before a new counting process begins.

FIG. 4 also shows that the separating wedge 19 and the separating knives 20 are used both for the covers of smaller diameter corresponding to those covers shown with solid lines and also for covers with larger diameters as is indicated by the dashed lines.

To fit the feed mechanism to different cover diameters the twin levers 12 are pivotally mounted and according to FIG. 3 are kept in the supporting piece 14 lockable and movable spaced from each other and opposite each other. This movability and lockability is given to the levers 12 by the elongated holes provided in the supporting pieces 14 through which retaining screws 30 attached to the twin levers extend. In the right portion of FIG. 3 the swung out position of the twin lever is indicated with dashed lines in contact with a cover of enlarged diameter similarly shown with dashed lines.

Also, the supporting frame 4 is adjustable in height. Moreover, the spacing of the supporting members 4*b* of the supporting frame 4 is changable transverse to the longitudinal direction of the conveying trough.

Figure 5:
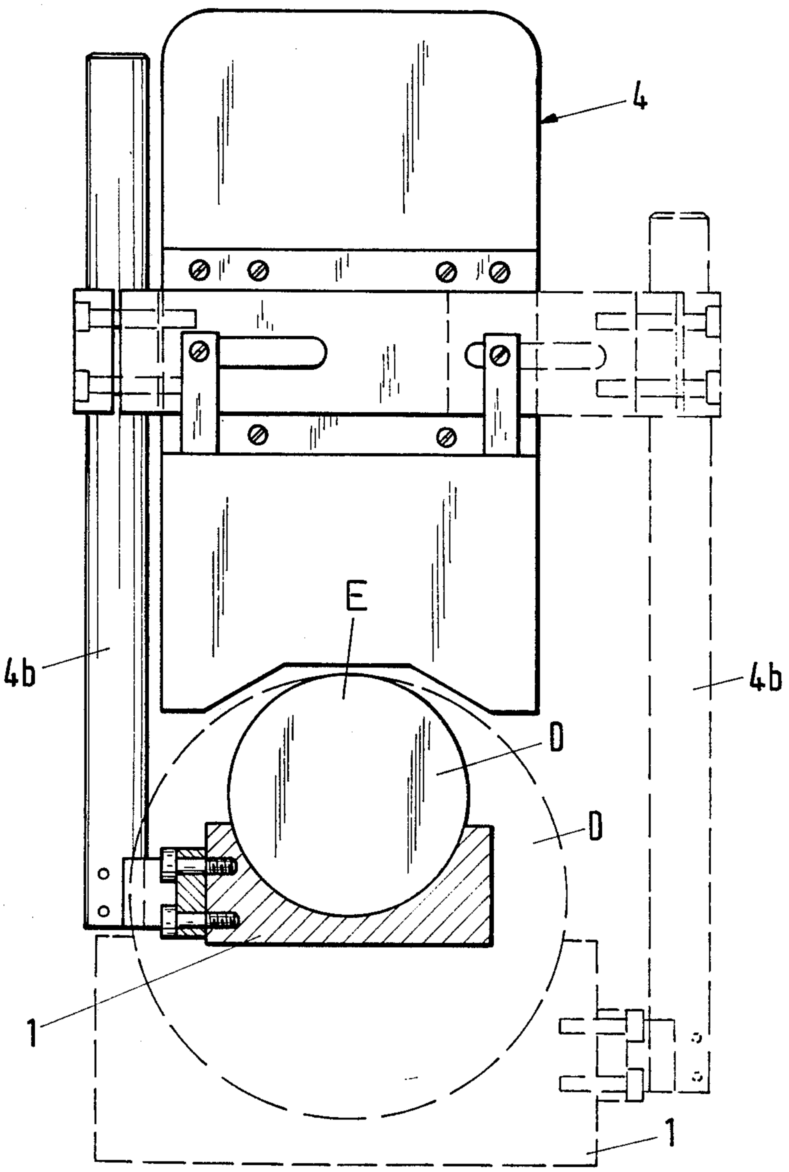
FIG. 5 is similarly a cross-sectional view through the apparatus taken along the section line V—V of FIG. 1.

FIG. 5 shows the height and lateral adjustability of the supporting members 4*b* which can be used to fit conveying troughs 1 of different dimensions. A conveying trough 1 for covers of larger diameters is indicated with dashed lines and the supporting members 4*b* are adjustable to the necessary height and the required lateral spacing. The apparatus allows thus an adjustment to covers or other disk-like workpieces of different diameter with an extraordinarily reduced effort or expense for these adjusting operations.

We claim:

1. In an apparatus for making separate piles of equal numbered flat disk-like workpieces, especially can covers, placed side-by-side or contacting each other from a stack longitudinally moving in a conveying trough comprising an electronic counter and controller, a separating mechanism with an engaging piece guided into said stack and guided slidably substantially parallel to said conveying trough accelerating said pile being formed forwardly, the improvement comprising a sensor operating without contact, responding to an edge of said workpieces as a pulse generator and connected with said electronic counter, a feed device shiftable into a clamped and a released position engaged with said stack upstream from said sensor in the feed direction, which is drivable in said clamped position by said controller with at least two feed speeds one of which corresponds to a creeping or slow process said separating mechanism being equipped with a separating wedge movable to-and-fro transversely to said stack for formation of a separating gap between adjacent ones of said workpieces of said pile and said stack in the vicinity of said edges of said workpieces and at least two separating knives operatively connected to a longitudinal drive acting in the longitudinal direction of said stack.

2. The improvement according to claim 1 wherein said sensor, said feed device and also said separating mechanism are mounted in a common supporting frame extending upward and along said feed trough with a plurality of adjustable-heigt supporting members attached releasably with said feed trough and adjustable laterally in a direction transverse to said feed trough.

3. The .improvement according to claim 1 wherein said sensor is-mounted on an adjustable-height sliding guide held spring-loaded in said supporting frame.

4. The improvement according to claim 1 wherein said sensor comprises a reflection sensor with two sensor cells.

5. The improvement according to claim 1 wherein said feed device has a motorized carriage movable above said stack along said supporting frame with twin levers pivotally connected to said carriage each of which carry a clamp jaw on an end pressable against said stack and are operatively connected to a spreader operable against the action of a spring on the other end of said lever opposite said stack.

6. The improvement according to claim 5 wherein said spreader comprises two supporting pieces each operatively connected to the other by said spring and with one of said twin levers having oppositely-inclined inclined surfaces facing each other and a wedge slidable along and between said inclined surfaces.

7. The improvement according to claim 6 wherein said wedge is connected and is slidable with a spreader drive mounted on said carriage of said feed device.

8. The improvement according to claim 7 wherein said twin levers of said feed device are lockable and movable to and from each other with said other ends of said levers held in said supporting pieces to change the spacing of said clamping jaws.

9. The improvement according to claim 8 wherein said separating knives are guided adjacent said separting wedge on both sides of said separating wedge into said separating gap and are held on a sliding support guided in said supporting frame and said separating wedge is guided by a plurality of slide rods in said sliding support for said separating knives.

10. The improvement according to claim 9 wherein said slide rods for said separating wedge and said sliding support for said separating knives have a common separating drive, which engages on said slide rods for said separating wedge and in guiding said separating wedge into said stack said sliding support travels with said slide rods after said slide rods traverse an adjustable empty space.

11. The improvement according to claim 9 wherein said separating knives are mounted on push rods passing through said sliding support, which are operatively connected to said longitudinal drive acting along said conveying trough and said longitudinal drive is pivotally connected to said supporting frame with an end opposite from said separating wedge pivotable upwardly.

12. The improvement according to claim 11 wherein said longitudinal drive comprises a piston-cylinder drive.

13. The improvement according to claim 1 wherein said cutting knives have oppositely-inclined inclined engaging edges.

14. An apparatus for making separate piles of equal numbered flat disk-like workpieces, especially can covers, placed side-by-side or contacting each other from a stack longitudinal moving in a conveying trough comprising:

an electronic counter and controller;

a reflection sensor with two sensor cells operating without contact, responding to an edge of said workpieces as a pulse generator, mounted on an adjustable-height spring-loaded sliding guide and connected with said electronic counter;

a feed device shiftable into a clamped and a released position engagable with said stack upstream from said sensor in the feed direction, which is drivable in said clamped position by said controller with at least two feed speeds one of which corresponds to a creeping or slow process and said feed device has a motorized carriage movable above said stack along said supporting frame with twin levers pivotally connected to said carriage each of which carry a clamp jaw on an end pressable against said stack and are operatively connected to a spreader operating against the action of a spring on the other end of said lever opposite said stack, said spreader comprising two supporting pieces each operatively connected to the other by said spring and with one of said twin levers having oppositely-inclined surfaces facing each other and a wedge slidable along and between said inclined surfaces by a spreader drive mounted on said carriage of said feed device;

a separating mechanism with an engaging piece guided into said stack and guided slidably substantially parallel to said conveying trough accelerating one of said piles being formed forwardly, said separating mechanism being equipped with a separating wedge movable to-and-fro transversely to said stack for formation of a separating gap between adjacent ones of said workpieces of said pile and said stack in the vicinity of said edges of said workpieces and at least two separating knives operatively connected to a longitudinal drive acting in the longitudinal direction of said stack; and a common supporting frame extended upward and along said feed trough with a plurality of adjustable-height supporting members attached releasably with said feed trough and adjustable laterally in a direction transverse to said feed trough in which said sensor, said feed device and also said separating mechanism are mounted.

15. An apparatus according to claim 14 wherein said separating knives are guided adjacent said separating wedge on both sides of said separating wedge into said separating gap and are held on a sliding support guided in said supporting frame and said separating wedge is guided by a plurality of slide rods in said sliding support for said separating knives and said slide rods for said separating wedge and said sliding support for said separating knives have a common separating drive, which engages on said slide rods for said separating wedge and in guiding said separating wedge into said stack said sliding support travels with said slide rods after said slide rods traverse an adjustable empy space, said separating knives being mounted on push rods passing through said sliding support, which are operatively connected to said longitudinal drive acting along said conveying trough and said longitudinal drive is pivotally connected to said supporting frame with an end opposite from said separating wedge pivotable upwardly.

* * * * *